(12) United States Patent
Tamam

(10) Patent No.: US 6,347,739 B1
(45) Date of Patent: Feb. 19, 2002

(54) SYSTEM FOR CREDIT CARD ACCEPTANCE IN TAXICABS

(76) Inventor: Amos Tamam, 45 Bayview Ave., Great Neck, NY (US) 11021

( * ) Notice: Subject to any disclaimer, the term of this patent is extended or adjusted under 35 U.S.C. 154(b) by 0 days.

(21) Appl. No.: 09/590,335

(22) Filed: Jun. 8, 2000

(51) Int. Cl.⁷ ............................................. G07B 15/02
(52) U.S. Cl. ..................................... 235/384; 235/449
(58) Field of Search ................................ 235/380, 375, 235/384, 449; 705/13, 417

(56) References Cited

U.S. PATENT DOCUMENTS

| | | |
|---|---|---|
| 4,570,228 A | 2/1986 | Ahlberg |
| 4,650,978 A | 3/1987 | Hudson et al. |
| 5,208,446 A * | 5/1993 | Martinez ............... 235/380 |
| 5,247,160 A | 9/1993 | Zicker |
| 5,289,369 A | 2/1994 | Hirshberg |
| 5,408,513 A | 4/1995 | Busch, Jr. et al. |
| 5,532,689 A | 7/1996 | Bueno |
| 5,572,004 A | 11/1996 | Raimann |
| 5,604,676 A | 2/1997 | Penzias |
| 5,678,010 A | 10/1997 | Pittenger et al. |
| 5,722,066 A | 2/1998 | Hu |
| 5,828,044 A | 10/1998 | Jun et al. |
| 5,897,626 A | 4/1999 | Pomerantz |
| 5,973,619 A | 10/1999 | Paredes |
| 5,974,397 A | 10/1999 | Olsson et al. |
| 5,991,410 A | 11/1999 | Albert et al. |
| 6,019,285 A | 2/2000 | Isobe et al. |

FOREIGN PATENT DOCUMENTS

GB 2143981 * 2/1985

* cited by examiner

Primary Examiner—Karl D. Frech
(74) Attorney, Agent, or Firm—Howard C. Miskin; Gloria Tsui-Yip

(57) ABSTRACT

An on board system for a taxicab having a wireless modem that allows a passenger to charge his fare by use of a credit card to a remotely located institution responsible for the charge account. The system also provides bilateral communication to allow messages to be successfully exchanged in order to successfully conduct the business of carrying passengers in the taxicab.

18 Claims, 5 Drawing Sheets

SYSTEM FOR CREDIT CARD ACCEPTANCE IN TAXICABS

BACKGROUND OF THE INVENTION 1.0. Field of the Invention

This invention relates to taxicabs and, more particularly, to a system on board a taxicab that allows a passenger to charge the fare to his/her account handled by a remotely located financial institution.

2.0. Description of Related Art

Taxicabs carry passengers for a fare usually measured by the distance traveled and are an increasingly popular mode of transportation, finding particular use in cities. The passengers using the taxicabs frequently carry a limited amount of ready cash relying on the use of credit or debit type cards to pay for expenses incurred. It is desired that a system be provided for credit card acceptance in the taxicabs.

The passengers using the taxicabs are commonly unfamiliar with the area in which the taxicabs are being driven. The drivers of the taxicabs, although familiar with the crowded cities, are commonly subjected to a relatively high level of stress. The intermingling of the passengers and the drivers within the confines of the taxicabs sometimes leads to a hostile environment which, in turn, sometimes leads to a dispute on the amount of the fare being charged by the driver. It is desired that means be provided for the use of credit cards for fare payment, but only after the amount of the fare is mutually agreed to by both the passenger and the driver of the taxicab.

The passengers of the taxicabs are commonly in a hurry to accomplish a desired task and sometimes leave articles of personal belongings in the taxicab. The passenger in an attempt to reclaim his lost personal articles commonly remembers the fleet name of the taxicabs, but hardly ever remembers the individual taxicab in which his/her personal articles were left. It is desired that the fleet owner be provided with means to easily reclaim the lost goods of the passenger so as to allow them to be quickly returned to the correct owner.

Because the taxicabs, as well as the fleet owners, serve an important public function, they are governed by regulations controlled by different governmental agencies. It is desired that a system be provided that allows for the fleet owners, as well as the different government agencies, to provide control governing the business aspects and conduct of the individual drivers of the taxicabs.

SUMMARY OF THE INVENTION

The invention is directed to an on board system with a wireless modem for a taxicab that allows a passenger to charge his fare to a remotely located charge account and also provides bilateral communication of messages concerned with the successful business of carrying passengers.

The system of the present invention is used on board a taxicab that allows for credit card acceptance, wherein the amount of fare being charged to the passenger is agreed to by both the passenger and the driver of the taxicab. The system provides the fleet owner with means to easily retrieve goods lost by the passengers of the taxicabs of the fleet owners. The system also allows both the fleet owner and the associated government agency to control the business aspects and conduct of the individual drivers of the taxicabs.

The system comprises a meter having computational capabilities, a card reader and a modem. The meter displays the fare being charged to a passenger, normally by distance, number of passengers and bags, has a plurality of ports and is responsive to application programs, at least some of which mandate a sequential exchange of information between the passenger and the driver before the fare is charged to the passenger. The card reader is connected to some of the ports of the meter and is operable therewith for reading information stored on a card (usually in magnetic strips or chips) that is releasably engageable with the card reader. The information stored on the card identifies a charge account. The modem provides wireless communications and has an input and an output, with the input thereof connected to some of the ports of the meter and the output thereof connected to an antenna.

DETAILED DESCRIPTION OF THE PREFERED EMBODIMENTS

Figure 1:
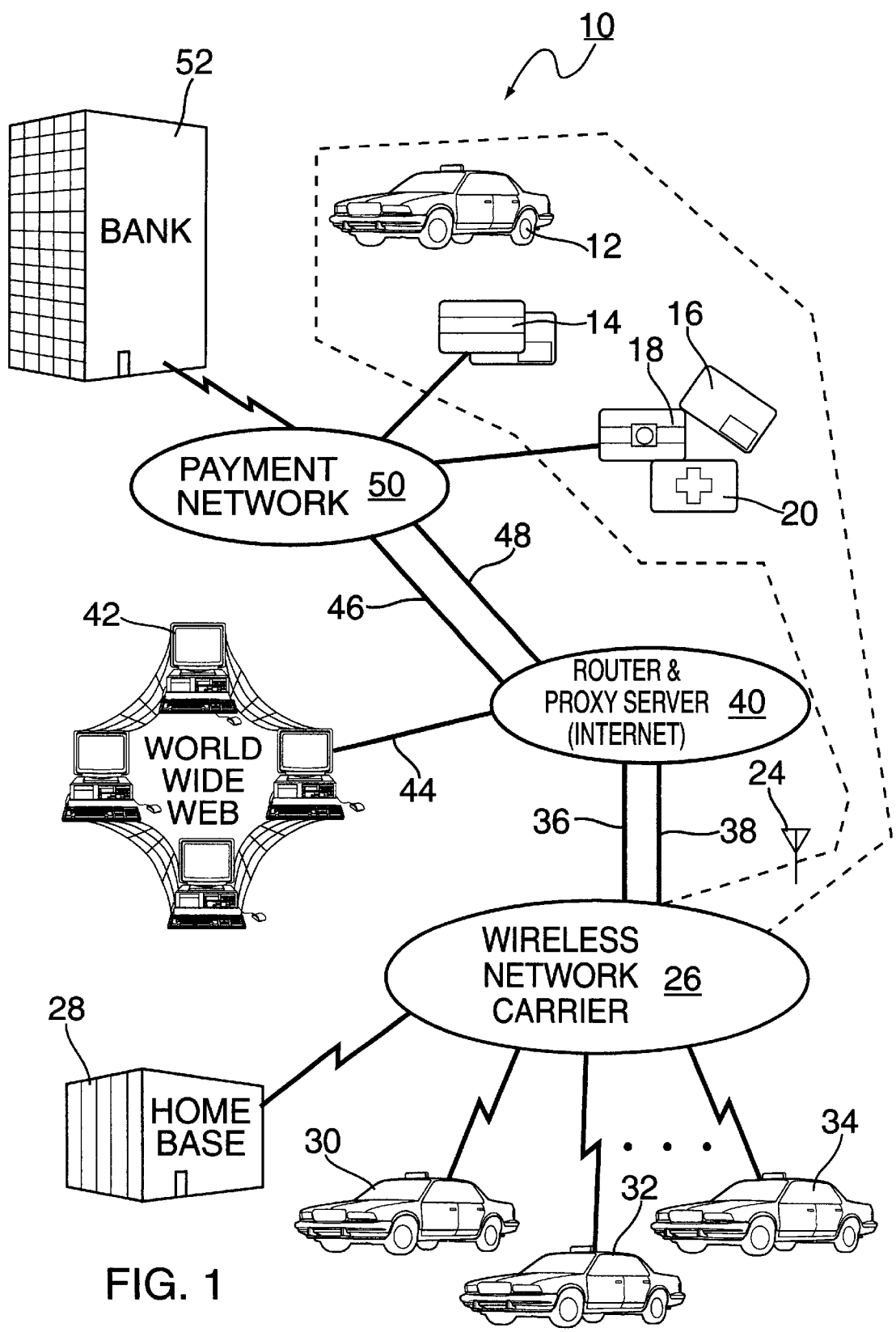
FIG. 1 is a pictorial representation of the system of the present invention interacting with associated facilities.

With reference to the drawings, wherein the same reference numbers indicate the same elements throughout, there is shown FIG. 1 a pictorial representation of a system 10 of the present invention that provides for credit card acceptance in taxicabs 12. The system 10 is integrally incorporated into taximeters of taxicabs to accept credit card payment and to verify credit card (14) information. The system 10 is similarly applicable to smart card (16) transactions, debit card (18) transactions and transactions involved the use of private label cards (20), such as those made available by Medicare.

The system 10 provides a modem 22 (not shown in FIG. 1, but to be described with reference to FIG. 2) that operatively cooperates with antenna 24. More particularly, the modem 22 has a communication protocol that interfaces and exchanges signals with a wireless network carrier 26 known in the art, such as those made available by provider AT&T. The wireless network carrier 26 allows the taxicab 12 to communicate with a home base 28 of a fleet operator, as well as to communicate with other taxicabs 30, 32 . . . 34.

The wireless network carrier 26 communicates, via signal paths 36 and 38, to a router and proxy server which are part of the Internet and generally designated by reference number 40. The signal paths 36 and 38 are respectively provided by a 1.5 MD DSL line provided for backup purposes and a dedicated frame relay connection, both paths being known in the art.

The router and proxy server 40 communicates with the world wide web 42, in a manner known in the art, by way of signal path 44. The router and proxy server 40 communicates for security transaction purposes, via signal paths 46 and 48, to a payment network 50 associated with a financial institution 52, such as a bank. The signal paths 46 and 48 are a ISDN line provided for backup purposes and a dedicated Ti line, both known in the art as well as payment network 50 being known in the art. The system 10 may be further described with reference to FIG. 2.

Figure 2:
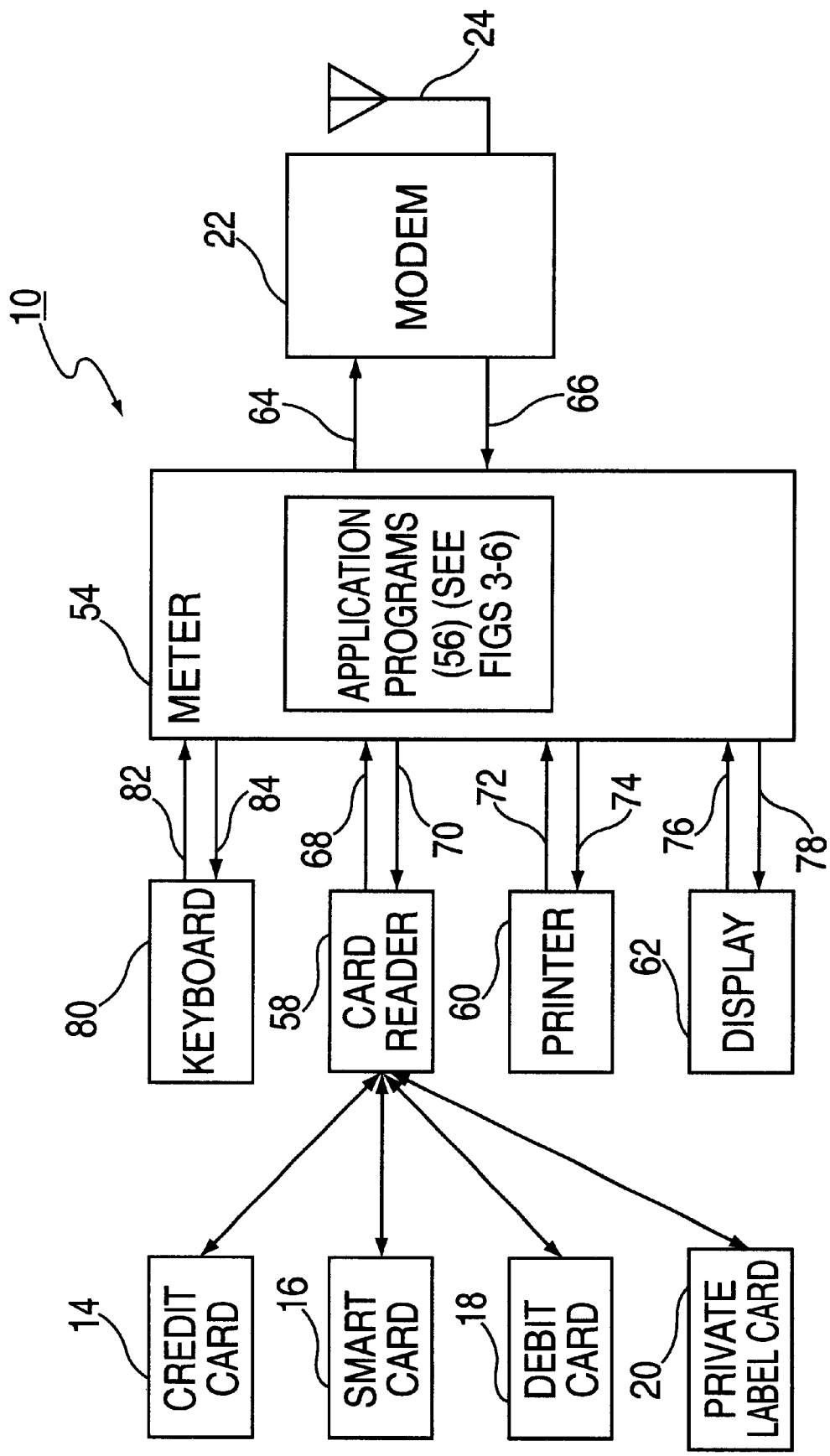
FIG. 2 is a block diagram of the present invention.

FIG. 2 illustrates a block diagram of the system 10 comprising a taxicab meter having computational capabilities which may be referred to herein simply as a meter 54. The meter 54 is operatively responsible to application programs 56 to be further described hereinafter with reference to FIGS. 3–7. The meter 54, as well as the other elements of system 10, are arranged and provided with excitation on board the taxicab 12 in a manner known in the art, but preferably the card reader 58, printer 60, and display 62 (to be further described) are arranged to be easily accessible to both the passenger and driver of the taxicab 12.

Meter 54, in a manner known in the art, provides conventional taxicabs functions, such as displaying the fare being charged to a passenger on the display 62 but, in addition thereto, generates a signal when the fare is no longer being charged and such a signal is used to initiate the operations of some of the application programs 56.

The application programs 56 can be in the form of a computer program code embodied in a tangible media, such as floppy disks, CD-ROM's, hard drives, or other computer-readable storage medium, wherein, when the application programs 56 are loaded into and executed by the meter 54, the meter 54 becomes an apparatus for practicing the present invention. The application programs 56 can be embodied in a form of a computer program code, for example, whether stored on a storage medium, loaded into and/or executed by a computer, such as that incorporated into meter 54 or transmitted over some medium, such as electrical wires or cabling, through fiber optics, or the electromagnetic radiation, wherein, when the application programs 56 are loaded into and executed by the meter 54, the meter 54 becomes an apparatus for practicing the present invention. The meter 54 has a plurality of ports some of which are connected to the input of modem 22 by way of signal paths 64 and 66, with the modem 22 having its output connected to the antenna 24 in a manner known in the art.

As previously discussed, with reference to FIG. 1, the modem 22 of taxicab 12 interfaces and exchanges signals with the wireless network carrier 26 which, in turn, allows the taxicab 12 to communicate with the home base 28, other taxicabs 30, 32 . . . 34, the router and proxy server 40, the payment network 50, and the financial institution 52. The modem 22 may be of the type selected from the group comprising Cellular Digital Packet Data (CDPD), CDMA, TDMA, AMP (cellular), all of which are known in the art.

The system 10 further comprises the conventional card reader 58 connected to some of the ports of the meter 54 by way of signal paths 68 and 70, and which is used for reading information stored on a card, such as the credit card 14, the smart card 16, the debit card 18 or the private label card 20. The information stored on the card identifies a charge account of the passenger using the taxicab 12 in which the system 10 is employed.

The system 10 further still comprises the printer 60 connected to some of the ports of the meter 54 by way of signal paths 72 and 74. In addition, system 10 preferably includes a display 62 connected to some of the ports of the meter 54 by way of signal paths 76 and 78. Both the printer 60 and display 62 are responsive to the application programs 56 for printing and displaying information involved in a sequential exchange between the passenger and the driver associated with the fare being charged the passenger and to be further described hereinafter with reference to FIGS. 3–7.

The system 10 preferably further comprises a keyboard 80 connected to some of the ports of the meter 54 by way of signal path 82 and 84 and which is used to provide pertinent information particularly useful for Internet applications and that are utilized by the application programs 56. The application programs 56 control the operation of system 10 to perform various function for the operation of taxicab 12, one of which may be further described with reference to FIG. 3 which illustrates a credit card acceptance process associated with the taxicab 12.

Figure 3:
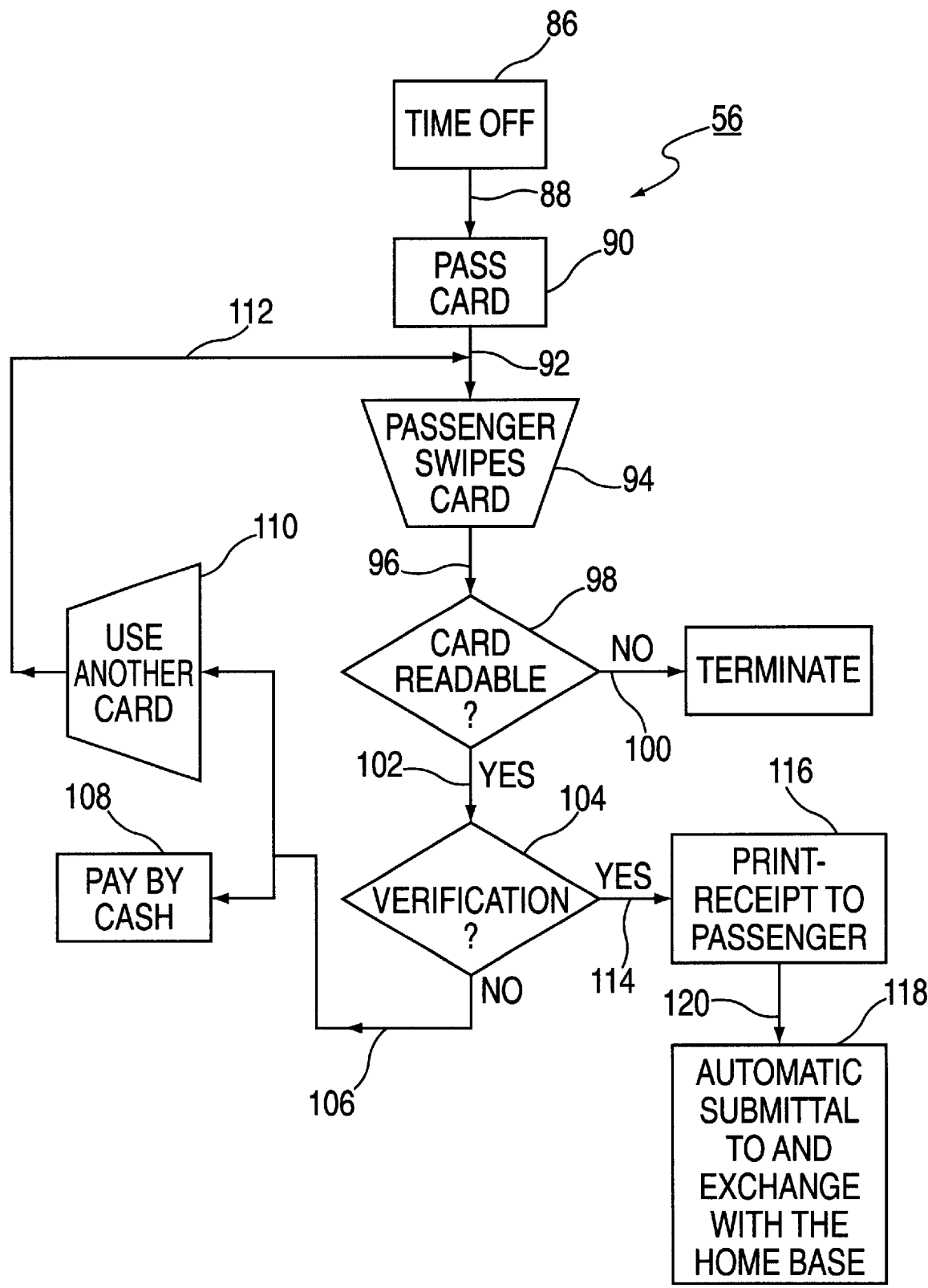
FIG. 3 is a flow chart of one aspect of the application programs associated with the practice of the present invention for handling a credit card transaction.

At the end of the ride when the driver presses the "TIME OFF" button on the meter 54, he/she causes a signal to be routed to the meter 54 which activates some of the application programs 56, and such activation is created by the event 86 of FIG. 3. The application programs 56 upon sensing the "TIME OFF" event 86 activates, by way of signal path 88, a "PASS CARD" light on the card reader 58 shown as event 90. The application programs 56 then pass control, via signal path 92, to wait for the occurrence of a manual operation 94.

At this point, the passenger can pay by cash, or pass his/her credit card through the card reader 58, as indicated by process 94. It is preferred that the passenger passes the credit card through the card reader and not the driver, but if agreed upon, the passenger may allow the driver to perform such a task.

In one embodiment of the present invention, the passenger is provided with a separate keyboard 80 and display 62, or some other appropriate output device. The passenger, before he/she swipes or releasably engages the card with the card reader 58, the passenger is allowed to make entries, such as fare and tip to be further described, into the meter 54 and is allowed to have the fare and tip displayed for verification by the passenger. If the passenger is satisfied, the passenger performs task 94 and the application programs 56 pass control, via signal path 96, to decision block 98.

Decision block 98 is associated with reading the card. If the card is not readable, the application programs 56 pass control, via signal path 100, so as to terminate the operation thereof. However, if the card is readable, the application programs 56 pass control, via signal path 102, to verification process 104.

Verification process 104 sends the necessary information to the banking institution 52 for authorization thereof. For this submittal, it is preferred that a modem 22 having a Cellular Digital Packet Data (CDPD) be used to transfer the total amount of the fare, extras, tolls and tip for bank authorization. The approval or denial from the financial institution 52 typically takes less than 10 seconds. If the verification process 104 declines approval it passes control, via signal path 106, to processes 108 (pay by cash) and 110 (use another card). If process 110 is selected, the application programs 56 passes control, via signal path 112 back to process 94. However, if the verification process 104 is successful, indicated by signal path 114, that is, if the card is approved, then the application programs 56 print the receipt (for the passenger), indicated by process 116. The receipt preferably includes the mandatory information required by law or regulations, including the fare, extras, tolls and tip (tolls and tip one line). Further, the receipt also includes the merchant account number for the financial institution 52 and the approval number.

If desired, the application programs 56 may pass control to process 118, via signal path 120, which automatically submits the information of process 116 to home base 28.

Figure 4:
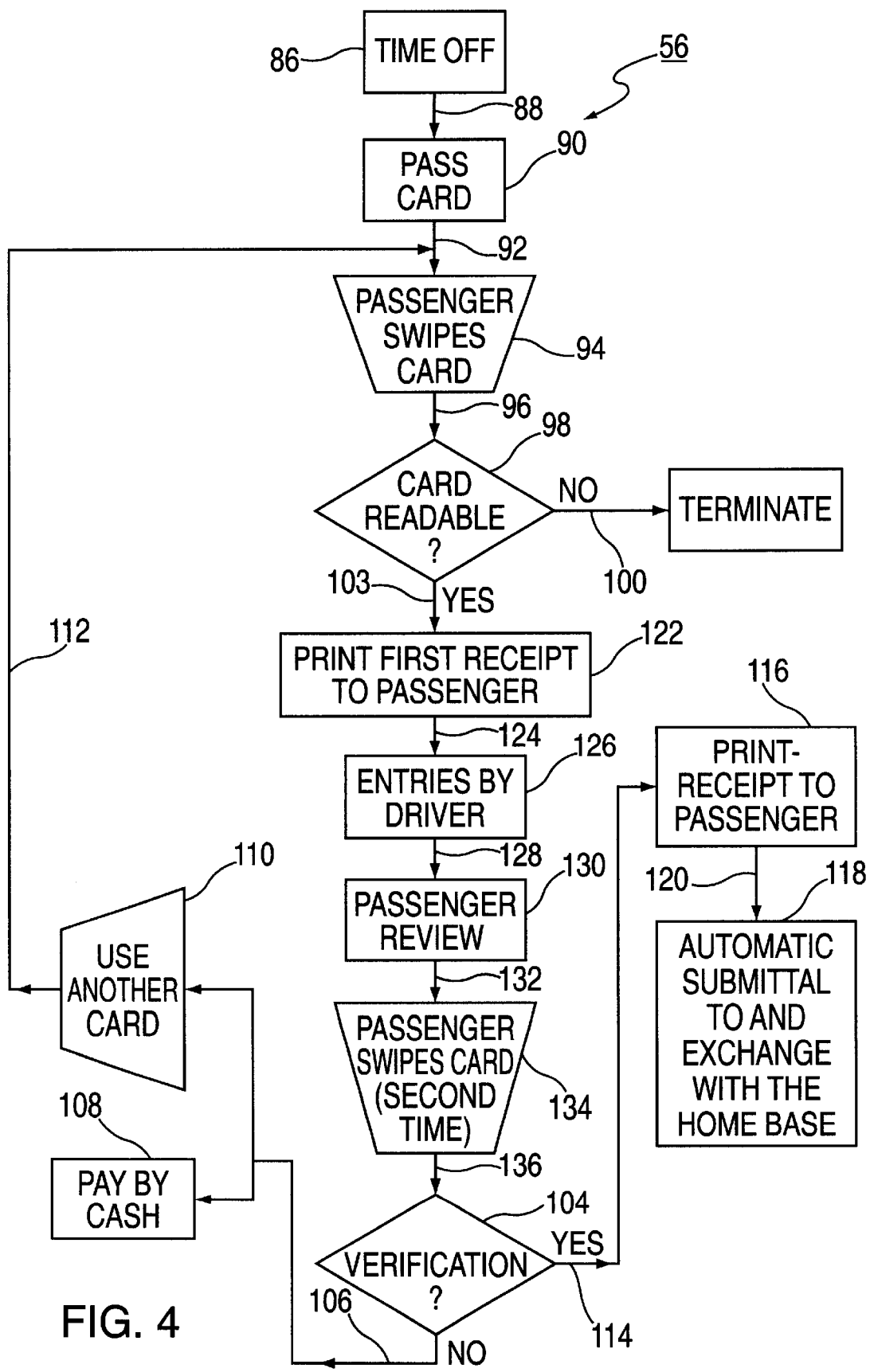
FIG. 4 is a flow chart of another embodiment of the present invention for handling a credit card transaction.

Another embodiment of the present invention may be further described with reference to FIG. 4 which is similar to that of FIG. 3 but involves a further interaction between the passenger and the driver in the obtainment of receipt printout information and is initiated after process 98 via signal path 103 for activating process 122.

Process 122 causes the printer to print a first receipt for the passenger. The first receipt may also be used for the driver's records and contains mandatory information required by law or regulations, which is taken into account by the appropriate programming of the application programs 56. For example, at the bottom of the receipt, there is preferably one line for tolls, one line for tip, one line for the total, and one line for the signature of the passenger. The driver may hand the first receipt to the passenger and the passenger may fill in the tolls, tip and total and then sign the receipt. At this point, the application programs 56 cause meter 54 to switch to the tip mode, allowing the driver to enter the tolls and tip amount indicated, on the first receipt, into the meter 54 by means of the keyboard 80 or some other appropriate means. After the tolls and tips are entered into the meter 54 by the driver, the application programs 56 pass control, via signal path 124, to process 126.

Process 126 allows the passenger to view the entered amounts, such as those appearing on a printout. If the amount is correct, the passenger again (second time) swipes his credit card through the card reader 58. The application programs 56, by way of modem 22 and indicated by signal path 136, pass control to the verification process 104, which operates ,as well as the subsequent elements associated with process 104,in a manner as previously described for FIG. 3.

It should now be appreciated that the practice of the present invention provides for application programs 56 having a credit card acceptance processes, whereby both the passenger and the driver are in agreement on the fare charged to the passenger and the financial institution of the passenger is duly notified and participates in such a charge.

Further, it should be appreciated that the financial institution 52 automatically transfers the funds to the merchant's bank account. The financial institution 52 may underwrite and guarantee to open merchants accounts to all individuals, as well as to taxicab fleet owner as long as the financial institution services the applicable charge account. In addition drivers that lease a medallion or vehicle may settle payment with their agent at the end of the driver's shift and such settlement may be provided by appropriate application programs 56.

Fleet owners, as well as the Taxi and Limousine Commission's (TLC) (or other governmental type agencies), lost E and found personnel can easily communicate with the driver, by way of the wireless network carrier 26 that communicates with the router and proxy server 40 (Internet). The system 10 may contain different standard messages. The fleet operator can select a message and send it to the driver with the message being printed on the receipt provided by application programs 56. This selection may occur when the meter 54 is in a vacant mode, known in the art.

The system 10 may also accommodate individual distinctive messages whose functions allow: (1) recovery in a relatively short time of lost and forgotten property in the taxicab; (2) fleet owners to send text messages to the driver; (3) fleet owners to send the shut down dates of the meters 54 which normally occurs 24 hours in advance before the actual shut down thereof; and (4) taxicab driver to send text messages from the taxicab to the fleet owner over the Internet. If desired, the system 10 communicating with the Internet, may allow for each taxicab to have an Internet Protocol (IP) address. This IP address allows the taxicab 12 to receive and send information to and from any particular taxicab. The application programs 56 also provide for the special fare situation which may be fully described with reference to FIG. 5.

Figure 5:
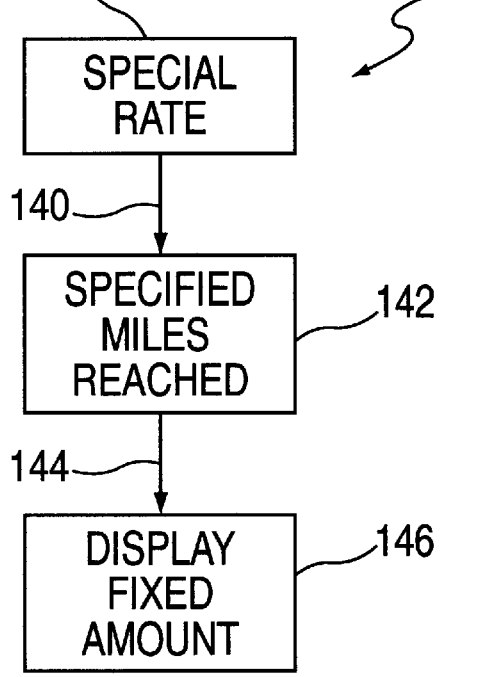
FIG. 5 is a flow chart of the application programs associated with a special rate fare of a taxicab.

The application programs 56 comprise a process 138 related to a special fare, such as that may occur for an airport fare. For example, the application programs 56 allow for a special rate of airport fare such as occurring in New York City and which amount is fixed by law or regulations and which may be identical to a regular rate except for the following parameters: (1) it is determined on distance only; (2) when the meter 54 reaches a certain number of miles, the meter 54 will display the regulated fixed amount and will not increment thereafter; (3) the meter receipt will indicate the standard receipt information, such as type of rate, start and end of time of trip, distance traveled, fare (the fixed amount), the standard text (previously discussed with reference to FIG. 3) plus any other text that may be required by further modifications of law or regulations; (4) the meter receipt may indicate an applicable special rate. The overall operation is shown in FIG. 5 by special rate process 138 passing control, via signal path 140, to process 142 related to the specified miles reached which, in turn, passes control, via signal path 144, to process 146 that displays the fixed amount. The application programs 56 may also accommodate fleet driver reconciliation and may be further described with reference to FIG. 6.

Figure 6:
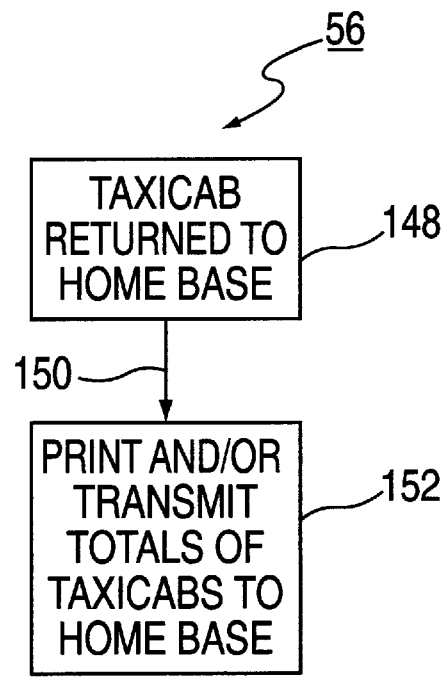
FIG. 6 is a flow chart of the application programs associated with the return of a taxicab to its home base.

As seen in FIG. 6, the application programs 56 comprises a process 148 which is associated when the taxicab is returned to the home base, which, in turn, passes control via signal path 150, to process 152 for printing and/or transmitting totals for taxicabs. More particularly, at the end of the shift when the driver returns the taxicab, he/she can printout and/or transmit the totals from the meter 54 as indicated by event 152. The application programs 56 may perform the following functions: (1) they may print the accumulated totals and a summary of the credit card transactions, with the information printed providing the fleet operator and the driver with fare information enabling them to reconcile credit card charges; (2) they may automatically submit, preferably by way of a CDPD modem 22, the information comprising accumulated tolls, credit card charges including the fare, extras, tolls and tips, terminal identification number, time and date, miles, approval number and the credit card number for each transaction. The application program 56 may also provide messages particularly suited for the operation of the taxicab 12 while it is on patrol gathering and serving passengers and may be further described with reference to FIG. 7.

Figure 7:
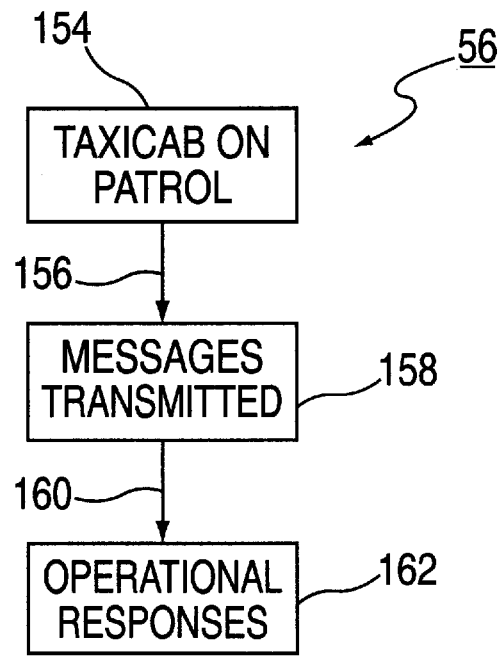
FIG. 7 is a flow chart of the application programs associated with the taxicabs being on patrol.

FIG. 7 illustrates the application programs 56 as comprising a process 154 representative of a taxicab on patrol which passes control, via signal path 156, to process 158 representing applicable messages being exchanged between the taxicab 12 and the fleet owner or other taxicabs 30, 32 . . . 34 which, in turn, passes control via signal path 160, to process 162 which represents the operational responses of both the taxicab driver but also the fleet owner, other taxicabs 30, 32 . . . 34 or even the associated governmental agencies associated with taxicabs.

It should now be appreciated that the practice of the present invention provides for a on board system 10 with the modem 22 for a taxicab 12 that allows the passenger to charge its fare to a remotely located financial institution handling the charge account and also provides bilateral communication of messages concerned with the successful conduct of doing business for carrying passengers.

It is understood that the invention is not limited to the specific embodiments herein illustrated and described but may be otherwise without departing from the spirit and scope of the invention.

What I claim is:

1. A system for communications with a network of systems which accepts credit-debit type cards for payment and which is located in a taxicab driven by a drivers comprising:
   a) a meter mounted in the taxicab, having computing capabilities for determining and displaying the fare being charged to a passenger, and having application programs at least some of which mandate a sequential exchange of electronic information between said passenger and said driver regarding the fare that includes the charge for the distance that said passenger was transported by taxicab driven by said driver before said fare is charged to said passenger, said meter further having a plurality of ports;
   b) a credit-debit card reader electrically connected to some of said ports of said meter and operable therewith for read information stored on a credit-debit card that is releasably engagable with said card reader, said information identifying a charge account; and
   c) a modem for wireless communications electrically connected to some of said ports of said meter and to an antenna for transferring information between said meter and said network of systems.

2. The system according to claim 1, wherein said credit-debit card is selected from the group consisting of credit cards, smart cards, debit cards, and private label cards.

3. The system according to claim 1 further comprising a display electrically connected to some of said ports of said meter.

4. The system according to claim 1 further comprising a printer electrically connected to some of said ports of said meter and responsive to said application programs for printing out information involved in said sequential exchange between said passenger and said driver before said fare is charged.

5. The system according to claim 1 further comprising a keyboard electrically connected to some of said ports of said meter and providing input information for said application programs.

6. The system of claim 1 wherein said network of systems include a wireless network carrier and said modem transfers information between said meter and said wireless network carrier.

7. The system of claim 6 wherein said network of systems further include a second system and said modem transfers information between said meter and another meter of said second system.

8. The system of claim 6 wherein said network of systems further include a financial institution and said modem transfers information between said meter and said financial institution for verification and authorization of said credit-debit type card.

9. The system of claim 6 wherein said network of systems further include a home base of taxicabs and said modem transfers information between said meter and said home base.

10. The system of claim 6 wherein said network of systems further include the world wide web and said modem transfers information between said meter and said world wide web.

11. A method for charging the fare encountered by a passenger riding in a taxicab driven by a driver to a charge account of a credit-debit type card via communications with a network of systems, said method comprising the steps of:
   a) providing said taxicab with a meter mounted thereon for determining and displaying the fare being charged to a passenger and generating a signal when said fare is no longer being charged, said meter having computing capabilities and a plurality of ports;
   b) providing said taxicab with a credit-debit card reader connected to some of said ports of said deter and operable there with for reading information identifying a charge account;
   c) providing said meter with application programs at least some of which mandate a sequential exchange of electronic information between said passenger and said driver regarding the fare that includes the charge for the distance that said passenger was transported by taxicab driven by said driver before said fare is charged to said passenger, said exchange being initiated when said signal indicative that said fare is no longer being charged is present; and
   d) providing a modem for wireless communication with said network of systems electrically connected to some of aid ports of said meter and to an antenna.

12. The method according to claim 11, further comprising the step of providing said taxicab driver with a keyboard and an output device for displaying contents that are dependent on inputs entered from said keyboard by said passenger, said keyboard and output device being electrically connected to ports of said meter.

13. The method according to claim 12 further comprising the step of providing said taxicab with a modem for wireless communications and having an input and an output, with the input thereof electrically connected to some of said ports of said meter and the output thereof electrically connected to an antenna, and wherein said application program comprise the steps of:
   a) displaying to the passenger the fare to be charged;
   b) monitoring the ports of said keyboard for inputs entered from keyboard by said passenger representative of said fare to be charged;
   c) swiping said credit-debit card by said passenger through said card reader;
   d) reading said information stored on said credit-debit card to identify said charge account of a financial institution;
   e) sending signals to a financial institution representative of the fare being charged said passenger; and
   f) waiting for verification by said financial institution that said fare is authorized and is charged to said charge account.

14. The method according to claim 11 further comprising the step of providing said taxicab with a printer electrically connected to some of said ports of said meter, said printer being responsive to said application programs for printing out information involved in said sequential exchange between said passenger and said driver for said fare being charged.

15. The method according to claim 14 wherein said application programs comprise the steps of:
   a) swiping said credit-debit card by said passenger through said card reader;
   b) reading said information stored on said card;
   c) printing a first receipt of said fare being charged to said passenger;
   d) examining and verifying said first receipt by said passenger;
   e) inputting a tip into said meter;

f) again swiping said card by said passenger through said card reader;

g) reading said information stored on said card to identify said charge account of a financial institution;

h) sending signals to a financial institution representative of the fare and tip being charged said passenger;

i) waiting for verification by said financial institution that said fare and tip is authorized and is charged to said charge account; and j) printing a second receipt of said fare and tip being charged to said passenger.

16. The method according to claim 11 further comprising the step of interfacing and exchanging signals with the Internet.

17. The method according to claim 11 further comprising the step of interfacing and exchanging signals with a home base of said taxicab, so as to exchange operational messages between said taxicab and said home base.

18. The method according to claim 11 further comprising the step of interfacing and exchanging signals with other taxicabs.

* * * * *